Jan. 8, 1963
E. A. TIMM
3,071,989
FEED MECHANISM FOR MACHINE TOOLS
Filed Nov. 8, 1960
2 Sheets-Sheet 1
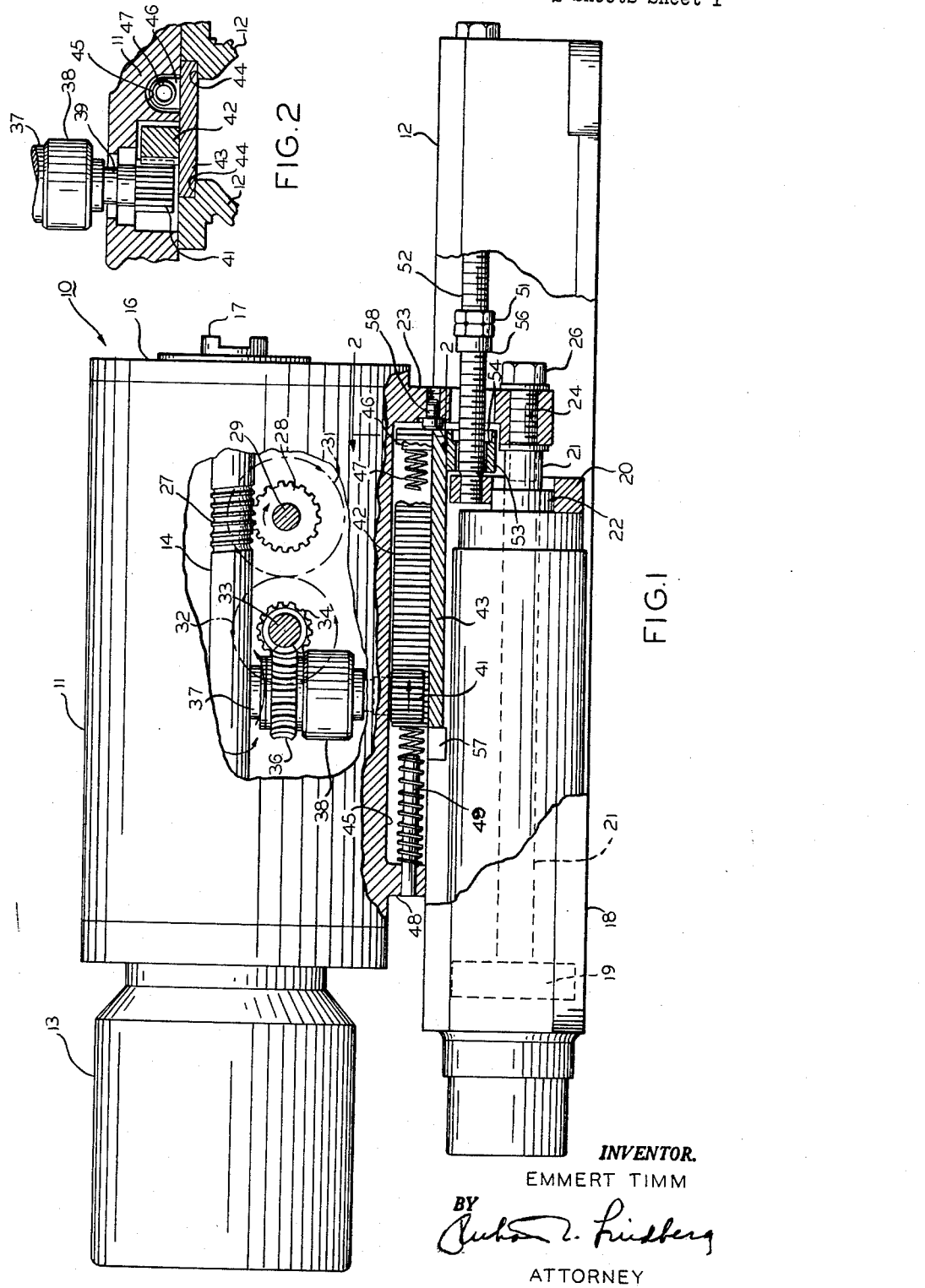
INVENTOR.
EMMERT TIMM
BY
*Auton L. Lindberg*
ATTORNEY Jan. 8, 1963  E. A. TIMM  3,071,989
FEED MECHANISM FOR MACHINE TOOLS
Filed Nov. 8, 1960  2 Sheets-Sheet 2

INVENTOR.
EMMERT TIMM
BY
ATTORNEY

United States Patent Office 3,071,989
Patented Jan. 8, 1963

3,071,989
FEED MECHANISM FOR MACHINE TOOLS
Emmert A. Timm, Freeport, Ill., assignor to Hoefer Mfg.
Co., Inc., Freeport, Ill., a corporation of Illinois
Filed Nov. 8, 1960, Ser. No. 67,980
6 Claims. (Cl. 77—33.5)

This invention relates generally to feed mechanisms for machine tools or the like, and particularly to a feed mechanism having a rapid traverse to an operating position and a slower feed speed during the operating portion of the work cycle.

It is a principal object of this invention to provide a fluid operated feed mechanism for a machine tool, where the tool is rapidly moved by the motive fluid to a working position, and where the effort of the motive fluid is thereafter controlled to advance the tool at a slower feed rate.

Another object is to provide a machine tool mechanism consisting of a fluid operated motor for moving the tool rapidly to working position and structure connected with a rotating spindle of the tool and the fluid operated motor, so as to control the rate of feed movement of the fluid operated motor after the tool has reached the working position.

A still further object is to provide a combination of fluid pressure and mechanical feed for a spindle of a machine tool, including a fluid motor for advancing the tool to operating position and mechanism driven from the tool spindle including a one-way clutch which is controllably released so as to cause the fluid motor to advance the tool at the proper feed rate.

Other objects and important features of the invention will be apparent from a study of the specification following taken with the drawings, which together describe and illustrate a preferred embodiment of the invention, and what is now considered to be the best mode of practicing the principles thereof. Other embodiments may be suggested to those having the benefits of the teachings herein, and such other embodiments are intended to be reserved especially as they fall within the scope and spirit of the subjoined claims.

In the drawings:

FIG. 1 is a front elevational view of a machine tool having the improvements according to the present invention embodied therein, showing the position of the tool at the start of its rapid traverse to the operating position;

FIG. 2 is a section taken along the line 2—2 of FIG. 1 looking in the direction of the arrows;

Figure 3:
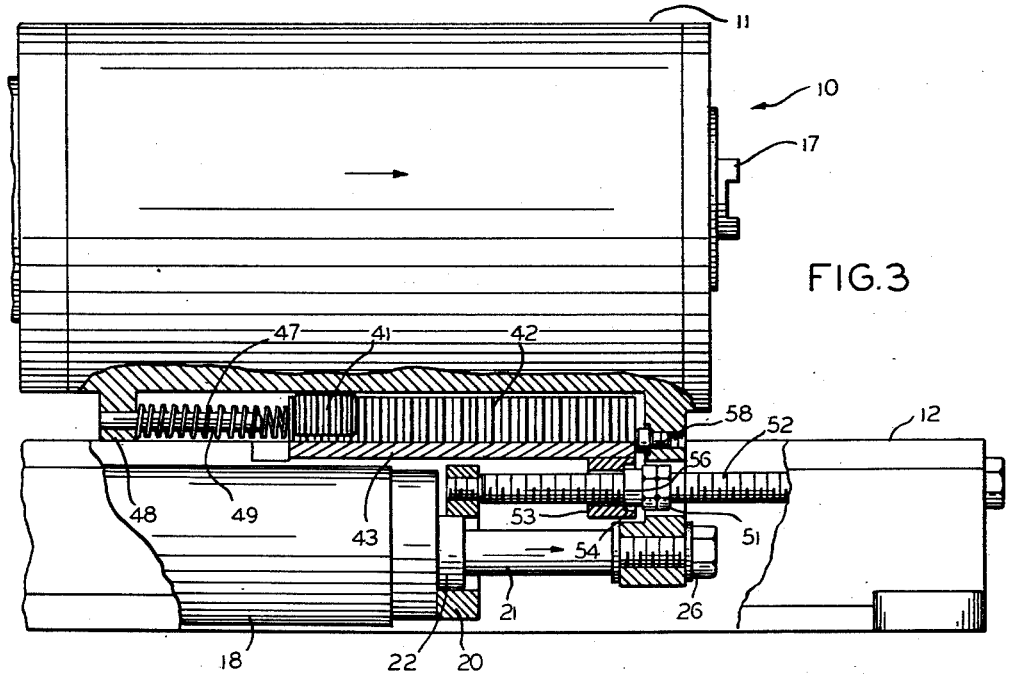
FIG. 3 is an elevational view, certain parts being broken away showing the tool at the completion of its rapid traverse to the working position and at the start of its feed movement.
Figure 4:
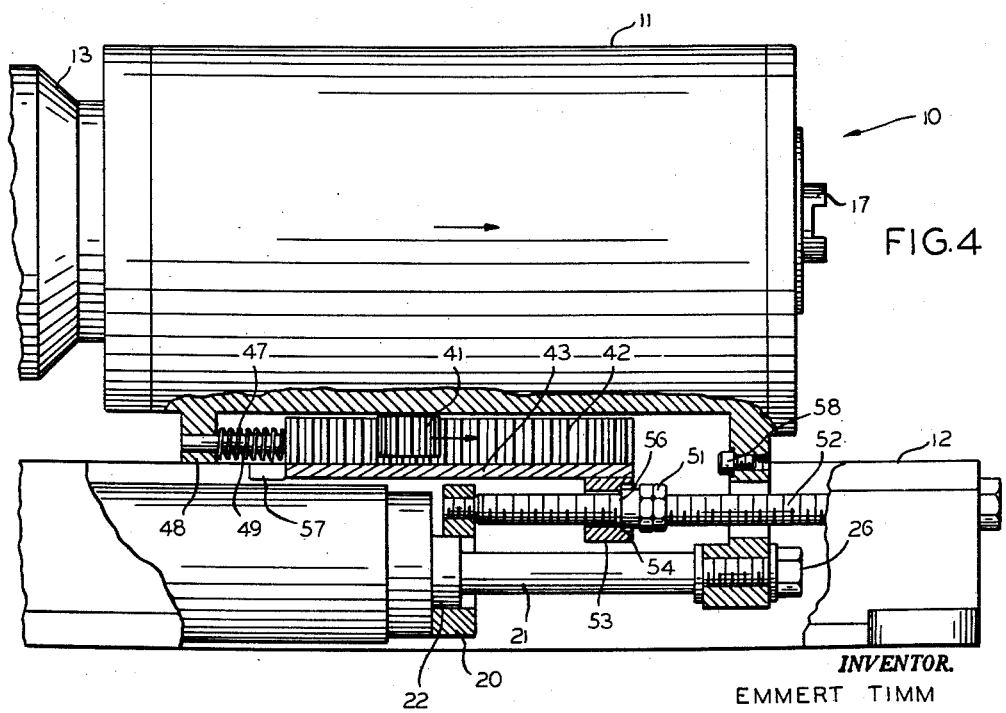
FIG. 4 is a view similar to FIG. 3, but showing the machine tool in its feed movement.

Referring now to the drawings, the improved feed mechanism according to the present invention is embodied in a machine tool referred to generally by the reference numeral 10, and comprising a main housing 11 arranged to move on laterally spaced guideways 12. The housing 11 supports a drive motor 13 which encloses a speed reducing train, not shown, driving a work spindle 14 supported in bearings, not shown, mounted in an end wall 16 of the housing 11. The end of spindle 14 protruding from the housing 11 has suitable jaws 17 for securing a rotating tool such as a drill, boring tool, countersink tool or the like thereto.

The main housing 11 and its motor 13 are arranged to be moved on the guideways 12 by an air cylinder 18 which is secured beneath the guideways 12 in any convenient manner including a forward mount 20 secured to the spaced guideways 12. The air cylinder 18 has a piston 19 slidable therein and a piston rod 21 extending from piston 19 is guided in a gland 22 at the piston rod end of the cylinder. Gland 22 is supported in the forward mount 20 as seen in FIG. 1. The piston rod 21 is connected to an ear 23 extending down from the housing 11, and between the spaced guideways 12. The ear 23 is tapped at 24 to receive a cap screw 26 which is threaded into the end of the piston rod 21 protruding from the cylinder 18. The piston 19 within the cylinder 18 and the piston rod 21 are thus adapted to move the housing 11 with the motor 13 along the guideways 12.

Structure is provided for advancing the housing 11 along the spaced ways 12 at a prescribed feed rate after the housing 11 has been moved to a tool operating position by the piston 19. Power for such feed movement is also provided by the cylinder 18, but the rate of such movement is controlled by structure as will now be described.

Work spindle 14 accordingly has a worm 27 cut therein which meshes with a worm wheel 28 fast on a shaft 29 supported in any convenient manner within the housing 11. A spur gear 31 is fast on the shaft 29, and meshes with a spur gear 32 fast on a shaft 33, shaft 33 also being supported in any convenient manner in the housing 11. A worm 34 is fast on the shaft 33 and meshes with a worm wheel 36 extending vertically in the manner as seen in FIGS. 1 and 2, and supported in any convenient manner in the housing 11. A one-way clutch 38 is connected between the shaft 37 and an output shaft 39 having a pinion 41 mounted thereon. The pinion 41 is engaged with a rack 42 secured to a plate 43 moving in spaced slots 44 formed in the spaced guideways 12.

The plate 43 and the rack 42 are arranged to move with the housing 11 during the rapid traverse of the housing 11 by the cylinder 18. The plate 43 accordingly has an abutment 46 extending upward therefrom, and a compression spring 47 is constrained between the abutment 46 and abutment 48 extending from the lower side of the housing 11 and arranged to be guided on the guideways 12, 12. A slot 45 in the housing 11 affords clearance for the spring 47 and abutment 46. A guide pin 49 extends from the abutment 48 and within the slot 45 toward the abutment 46 and serves to guide the compression spring 47.

The movement of the plate 43 and the rack 42 supported thereon is limited by an adjustable stop 51 comprising a pair of lock nuts which are threaded on long screws 52, each of which is supported on one of the spaced guideways. The other end of the screw is threaded into the mount 20 for the air cylinder 18. The plate 43 has an ear 53 depending therefrom which is bored in the manner shown to clear the screw 52, and a shoulder 54 in the ear 53 is arranged to move into contact with a shoulder 56 on one of the adjusting nuts 51 so as to limit the movement of the plate 43 and the rack 42.

The plate 43 and the housing 11 are limited in their movement to the left by means of a stop 57 forming a part of the support for the cylinder 18. An adjusting screw 58 is tapped into the ear 23, and is adjusted with respect to the ear 23, the screw 58 moving into contact with the end of the plate 43 at the end of the return movement of the housing 11.

At the conclusion of the rapid traverse stroke the ear 53 depending from the slide plate 43 is in contact with the stop nut 46, at which time the housing 11 and the spindle 14 are in position for the slow feed movement necessary for the tool supported by the spindle 14. The pressure against the piston 19 in the cylinder 18 would normally tend at this time to carry the housing 11 forward but it is locked in position by the one-way clutch 38. Because of the force from the cylinder 18, the housing and pinion gear would tend to move along the rack in a continued rapid traverse. Such tendency would have the effect of turning the shaft 37 at a speed greater than that which normally would be provided by the worm 27 and the gear train therebetween, and the worm wheel 36, and the resulting difference in such tendency to turn will cause the clutch 38 to lock up, thereby permitting the pinion 41 to proceed only at the prescribed rate allowed by the speed of the shaft 37. This reduced rate is the feed stroke for the housing 11.

At the end of the feed stroke the supply of air to the cylinder 18 is introduced thereto at the piston rod end of the cylinder 18 to move the piston 19 and the housing 11 to the left. Suitable control mechanism, not shown, is provided for controlling the supply of air to the opposite ends of the cylinder 18 according to whether the tool is in the work stroke or in a return stroke.

From the foregoing description it is believed evident that there has been provided a unique device characterized by the use of air against the cylinder at all times for supplying the motive power, whether the cylinder is to move the tool at a rapid traverse to a feed position or at a slower feed rate after moving to the feed position. Both the rapid traverse and the feed movement are provided by the air cylinder which is supplied with motive fluid at all times, and the rack and the overrunning clutch provided therewith afford a simple structure for providing the feed movement of the tool.

While the invention has been described in terms of a preferred embodiment, its scope is intended to be limited only by the claims here appended.

I claim:

1. In a machine tool, a housing having a rotating spindle therein, a guideway for said housing, a fluid operated motor for moving said housing along said guideway, a rack guided along said guideway including means normally constraining said rack for movement with said housing and said spindle, a pinion supported by said housing and meshing with said rack, means affording a driving connection between said pinion and said spindle, means limiting the movement of said rack when said housing is moved along said guideway by said fluid operated motor, and one-way clutch means interposed in said driving connection means affording controllable feed movement of said housing when said rack is in contact with the means limiting the movement thereof.

2. In a machine tool, a housing having a rotating spindle therein, a guideway for said housing, a fluid operated motor for moving said housing along said guideway, a rack guided along said guideway including spring means normally constraining said rack for movement with said housing and said spindle, a pinion supported by said housing and meshing with said rack, means affording a driving connection between said pinion and said spindle, means limiting the movement of said rack when said housing is moved along said guideway by said fluid operated motor, and one-way clutch means interposed in said driving connection means affording controllable feed movement of said housing when said rack is in contact with the means limiting the movement thereof.

3. In a machine tool, a housing having a rotating spindle therein, a guideway for said housing, a fluid operated motor for moving said housing along said guideway, a rack guided along said guideway including spring means normally constraining said rack for movement with said housing and said spindle, a pinion supported by said housing and meshing with said rack, means affording a driving connection between said pinion and said spindle, means supported by said guideway limiting the movement of said rack when said housing is moved along said guideway by said fluid operated motor, and means interposed on said driving connection means comprising a one-way clutch affording controllable feed movement of said housing when said rack is in contact with the means limiting the movement thereof.

4. In a machine tool, a housing having a rotating spindle therein, a guideway for said housing, a fluid operated motor for moving said housing along said guideway, a rack guided along said guideway including means normally constraining said rack for movement with said housing and said spindle, a pinion supported by said housing and meshing with said rack, means affording a driving connection between said pinion and said spindle, means limiting the movement of said rack when said housing is moved along said guideway by said fluid operated motor, and means interposed in said driving connection means comprising a one-way clutch affording controllable feed movement of said housing when said rack is in contact with the means limiting the movement thereof.

5. In a machine tool, a housing having a rotating spindle therein, a guideway for said housing, a fluid operated motor for moving said housing along said guideway, a rack guided along said guideway including means normally constraining said rack for movement with said housing and said spindle, a pinion supported by said housing and meshing with said rack, means affording a driving connection between said pinion and said spindle, means limiting the movement of said rack when said housing is moved along said guideway by said fluid operated motor, and a one-way clutch interposed in said driving connection means affording controllable feed movement of said housing when said rack is in contact with the means limiting the movement thereof.

6. In a machine tool, a housing having a rotating spindle therein, a guideway for said housing, a fluid operated motor for moving said housing along said guideway, a rack guided along said guideway including means normally constraining said rack for movement with said housing and said spindle, a pinion supported by said housing and meshing with said rack, means affording a driving connection between said pinion and said spindle, a stop on said guideway for said rack to limit the movement thereof when said housing is moved along said guideway by said fluid operated motor, and a one-way clutch interposed on said driving connection means affording controllable feed movement of said housing when said rack is in contact with said stop.

References Cited in the file of this patent

UNITED STATES PATENTS

| 2,587,352 | Manning | Feb. 26, 1952 |
| 2,884,653 | Hahn | May 5, 1959 |